United States Patent [19]
Gregory

[11] 3,729,801
[45] May 1, 1973

[54] NUTPLATE RIVETING DEVICE AND METHOD

[75] Inventor: Gerrett W. Gregory, Chula Vista, Calif.

[73] Assignee: Rohr Industries, Inc., Chula Vista, Calif.

[22] Filed: June 18, 1970

[21] Appl. No.: 47,541

[52] U.S. Cl. .................... 29/243.53, 29/464, 29/509
[51] Int. Cl. ............................................. B23p 11/00
[58] Field of Search .................... 74/822, 824, 816, 74/814, 822; 29/243.53, 464, 509

[56] References Cited

UNITED STATES PATENTS

| | | | |
|---|---|---|---|
| 3,518,745 | 7/1970 | Gray | 29/243.53 |
| 3,646,660 | 3/1972 | Shefler | 29/243.53 |
| 2,558,289 | 6/1951 | Bihler | 74/824 |
| 2,874,595 | 2/1959 | Foster | 74/824 |
| 3,030,826 | 4/1962 | Hediger | 74/822 |
| 3,064,499 | 11/1962 | Bullard | 7/822 |
| 3,093,014 | 6/1963 | Graft | 74/822 |
| 3,106,109 | 10/1963 | Dexter | 74/822 |
| 3,186,260 | 6/1965 | Dugas | 74/822 |
| 3,238,820 | 3/1966 | Buchanan | 74/822 |

*Primary Examiner*—Richard J. Herbst
*Assistant Examiner*—J. W. Davie
*Attorney*—George E. Pearson

[57] ABSTRACT

An upstanding housing serves as a lower pressure foot and contains a ram member having a spring loaded pilot pin extending exteriorly above the housing. The pin is adapted to engage in a hole in a nutplate attached to an apertured workpiece by a screw. The pin aligns the hole for drilling and rivet insertion and squeezing. The pin is retractable and becomes coterminal with the ram member for forming therewith a rivet squeezing anvil. After riveting of the nutplate, the screw is removed, leaving the nut of the nutplate in proper alignment with the aperture in the workpiece.

6 Claims, 4 Drawing Figures

Patented May 1, 1973
3,729,801
2 Sheets-Sheet 1
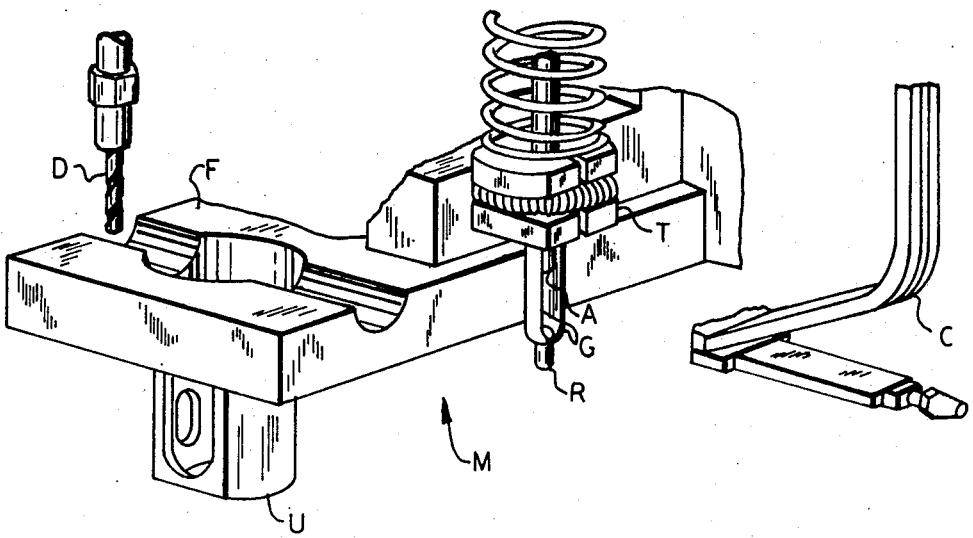
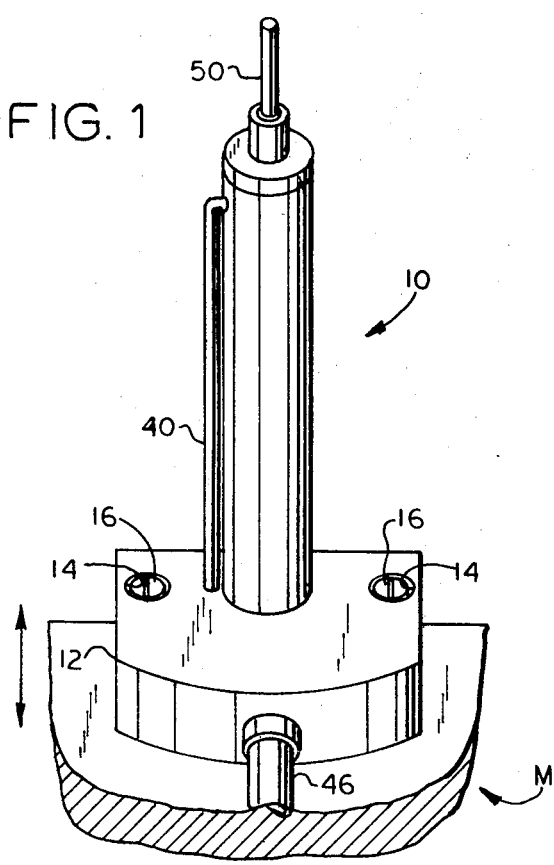
FIG. 1
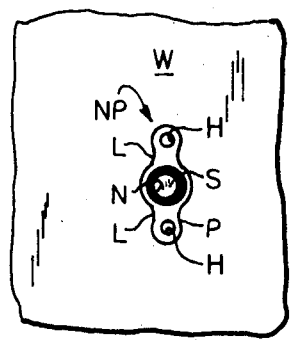
FIG. 4
INVENTOR.
GERRETT W. GREGORY
BY
George E. Pearson
ATTORNEY

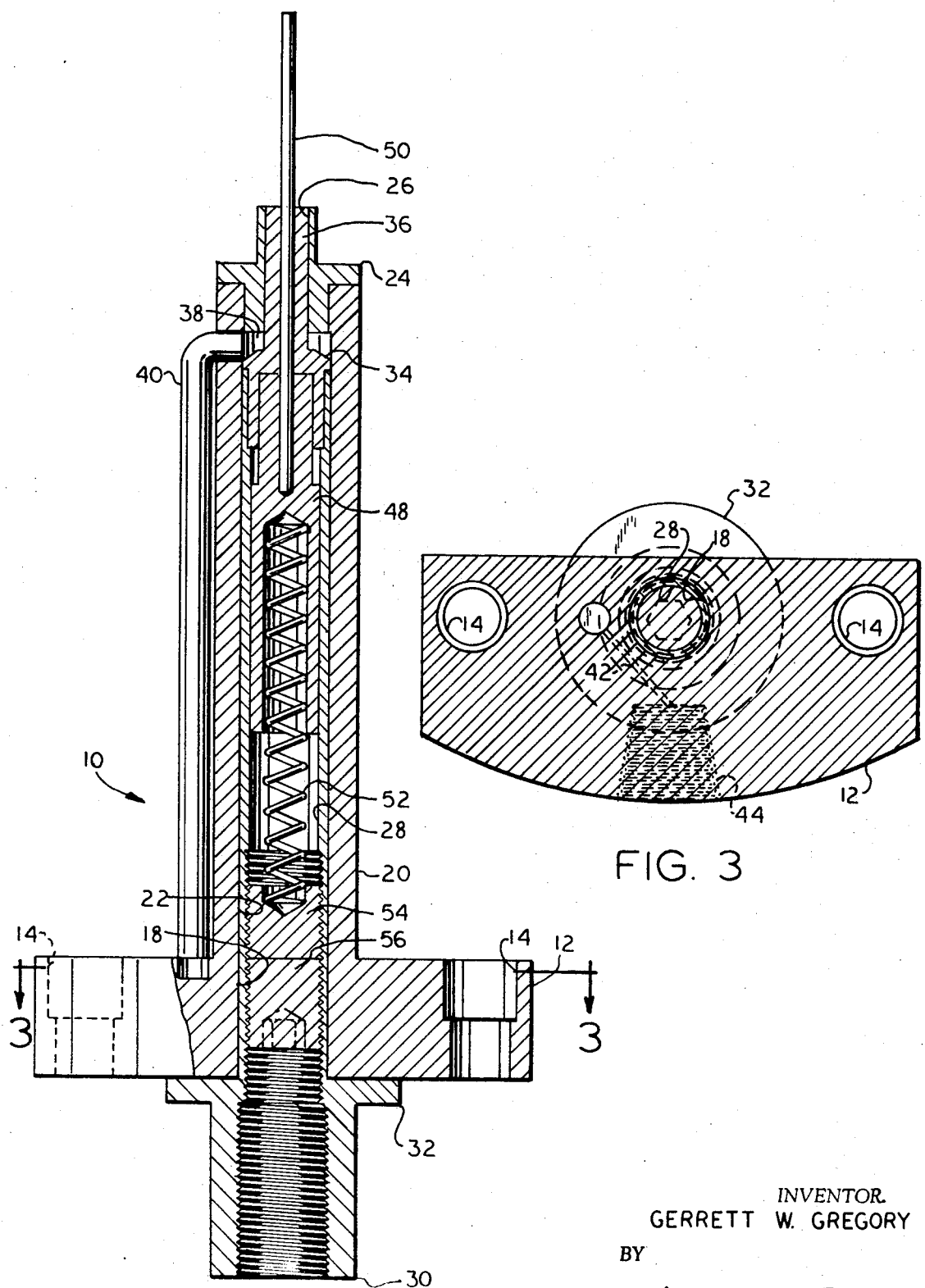

NUTPLATE RIVETING DEVICE AND METHOD

BACKGROUND OF THE INVENTION

The present invention relates generally to drilling and riveting machines, and more particularly to an attachment device therefor which serves as a combined pressure foot and squeezing anvil and provides for riveting a nutplate in proper alignment with an aperture in a workpiece.

In the fabrication of aircraft, many production assemblies are detachably secured together by means of nutplates and screws. To this end, each nutplate includes a nut and a plate with holes, the nut being aligned with an aperture in a workpiece and the plate riveted thereto. For proper and easy reception of a screw, the nut must, of course, be properly aligned with the aperture.

Heretofore, one method has been to drill and countersink a pair of holes in the workpiece adjacent the aperture, insert a rivet in each of the two holes and tape them to the workpiece. A nutplate was then installed on the rivets, after which they were squeezed. Finally, the tape was removed.

In another method, the nutplate was located on a drill jig, the two holes were drilled and countersunk in the workpiece and rivets were inserted and taped. The nutplate was installed and the rivets were squeezed, the tape then being removed.

In still another method, the nutplate was secured to the workpiece by a screw passing through the aperture and threadedly engaged with the nut of the nutplate, after which a hand drill was employed to perforate the workpiece. Usually, the drill was inserted in the holes of the nutplate and often times was not axially aligned with the result that the drilled perforation was not properly oriented with respect to the aperture or the hole was enlarged.

The several methods were not satisfactory because of the amount of time consumed or misalignment of the nut with the aperture so that the production assemblies could not be fitted together properly, thus leading to many rejects or resulting in a poor looking job.

The fabrication industry is highly competitive and any saving in the amount of time spent on an operation is reflected in a cost reduction of significant importance.

SUMMARY OF INVENTION

The present invention therefor contemplates and is concerned with a drilling and riveting machine and has as its primary purpose the provision of a nutplate riveting attachment device and method which rivets a nutplate to a workpiece in a rapid and reliable manner resulting in better workmanship, minimization of rejects, and a saving in time and labor with an attendant reduction in cost. Another object is to provide a device which locates a hole in a nutplate in proper alignment with a work station for drilling a perforation in the workpiece These and other objects and advantages are achieved by the provision of a housing containing a reciprocal ram member having a spring loaded pin engageable in a hole in the nutplate which previously has been secured to an apertured workpiece by a screw, the pin being retractable within a sleeve to become coterminal therewith and form a rivet squeezing anvil.

BRIEF DESCRIPTION OF THE DRAWINGS

FIG. 1 is a fragmentary perspective view showing a device embodying the principles of the present invention in relation to a drilling and riveting machine.

FIG. 2 is an enlarged vertical sectional view of the device.

FIG. 3 is a horizontal sectional view along line 3—3 of FIG. 2.

FIG. 4 is an enlarged fragmentary plan view of an apertured workpiece to which a nutplate has been secured by a screw passing through an aperture and threadedly engaged in the nut of the nutplate in preparation for riveting the nutplate to the workpiece.

DESCRIPTION OF EMBODIMENT

Referring to the drawings, in FIG. 1 there is fragmentarily shown a nutplate riveting attachment device 10 embodying the principles of the present invention and illustrating its relation to a drilling and riveting machine M, also fragmentarily shown. The machine M can be of any suitable type, that illustrated being typical of the "-Drivmatic" models, manufactured by General-Electro-Mechanical Corporation of Buffalo, New York. Such machines have a frame or base F mounting an apertured pressure foot U, a drill D and a rivet transfer means T. The rivet transfer means are equipped with the usual spring loaded fingers G for gripping a rivet R, and a vertically movable anvil A for engaging the head of the rivet for forcing it from the fingers and holding it during squeezing of the rivet. The rivet can be placed in the gripping fingers manually or fed automatically from a rivet feed chute C.

The attachment device 10 is mounted on a powered vertically movable portion of the machine M, in vertical alignment with the pressure foot U. Thus, work can be clamped therebetween, after which a rivet hole is drilled in the work and a rivet is inserted in the hole and squeezed.

The device 10 of the present invention includes an attaching block or base 12 having countersunk apertures 14 adapted to receive attaching screws or bolts 16. As shown in FIGS. 2 and 3, the base also has a through bore 18 with which an upstanding tubular housing 20 having a bore 22 is axially aligned. The housing is capped with a retainer bushing 24 having a central bore 26, the upper end of the bushing serving as a lower pressure foot cooperating with the upper pressure foot to clamp work therebetween.

The bores 18 and 22 are of like diameter and slidably fitted therein is a tubular ram member 28. At its lower end the ram member is provided with an internally threaded sleeve 30 having a flange 32 engageable with the underside of the base 12. The sleeve 30 is adapted to be connected to a squeezing ram, not shown. Fixed to the upper end of the ram member is a hollow cap 34 from which an elongated sleeve 36 extends into the bore 26 of the bushing 24. The parts are so dimensioned that there is an annular cavity 38 between the cap and the bushing, and the sleeve and the bushing are coterminal when the flange is engaged with the base.

A conduit 40 communicates with the cavity 38 and with a passageway 42 in the base 12. As shown in FIG. 3, the passageway is also in communication with a bore 44. The bore is adapted to have connected thereto an air delivery line 46, fragmentarily shown in FIG. 1.

Returning to FIG. 2, slidably fitted within the ram member 28 is a plunger 48. The upper end of the plunger has connected thereto an elongated pilot pin 50 which extends upwardly through the sleeve 36. The lower portion of the plunger is hollowed out and disposed therein is a coil spring 52 which reacts against a plug 54 to urge the plunger and pilot pin upwardly. The pin is of predetermined length and the plug is so placed relative to the lowe end of the plunger that when downward pressure is exerted on the pin and the lower end of the plunger engages the plug, the pilot pin is coterminal with the upper end of the bushing 26 and therewith forms a squeezing anvil. The plug is held in place by a lock set screw 56.

The device 10 is especially designed for riveting a nutplate NP to a workpiece W. As shown in FIG. 4, the nutplate has a nut N and a plate P with at least one hole H therein. Although the plate is shown as having a pair of aligned legs L with hols holes H and nut N therebetween, it will be appreciated that other commerically available plates are formed with the legs differently disposed. The nutplate is held to the workpiece by a screw S of suitable size which passes through an aperture, not shown, in the workpiece and threadedly engages the nut.

OPERATION

It is believed that the operation of the device of the present invention is clearly apparent is briefly summarized at this point. In preparation for riveting, a nutplate is screwed in alignment with each aperture in the workpiece W by a screw S, as shown in FIG. 4. Referring to FIG. 1, the workpiece and a nutplate are placed between the pressure foot U and the pilot pin 50 and manipulated to engage the pilot pin in a hole H. The machine M is then operated to cause clamping of the workpiece and nutplate between the pressure foot and the upper end of the bushing 24, the upper end of the sleeve 36 being below the same because the squeezing ram connected to the ram member 28 is retracted.

The drill D descends, perforates the workpiece and enters the aligned hole H. The drill is then moved away and the fingers G and upper anvil A are aligned with the pressure feet and operate to insert a rivet R in the perforation and hole and hold it there, causing retraction of the pilot pin. The squeezing ram forces the ram member 28 upwardly, the pilot pin remaining stationary until its upper end is even or coterminal with the upper end of the sleeve 36, after which they move together as a lower anvil to squeeze the lower end of the rivet. With this, the riveting operation is completed and the parts of the machine M are returned to starting positions for another riveting cycle.

There has thus been provided a nutplate riveting device and method which operates to rivet a nutplate to a workpiece in a rapid and reliable manner with quality workmanship and a resultant reduction in the number of rejects, time, labor and costs.

Although the present invention has been herein shown and described in considerable detail in what is believed to be the most practical and preferred embodiment thereof, it is to be understood that many variations thereof are possible and that the present invention is not to be limited to such details but is to be considered in its broadest aspects and accorded the full scope of the appended claims.

Having described the invention, what is claimed as new and desired to be protected by Letters Patent is:

1. A nutplate riveting attachment device comprising:
   a tubular housing having a base with a bore therethrough;
   a ram member mounted for reciprocal linear movement in the housing with one end thereof extending exteriorly of the housing and base and adapted to engage a means for supplying ram force;
   a plunger slidably fitted within the ram member for limited sliding therein and biased toward one end thereof; and
   an elongated pilot pin carried by the plunger coaxial thereto and projecting exteriorly of the housing for indexing a workpiece relative to the pilot pin.

2. The device of claim 1 wherein the pilot pin is resiliently mounted to the plunger.

3. The device of claim 1 wherein the plunger is movably mounted within the ram member with a limit of movement in which exterior projection of the pilot pin becomes coterminal with the housing for forming therewith an anvil means.

4. The device of claim 3 wherein the housing includes a sleeve, and the pilot pin is slidable in the sleeve.

5. The device of claim 3 wherein the pilot pin and the plunger have an overall length such that the pilot pin is coterminal with the sleeve at one end of movement of the plunger.

6. A nutplate riveting attachment device comprising:
   a housing having a base;
   a member mounted for reciprocal linear movement in the housing, said member has a sleeve at one end and a flange adjacent the other end, the member having a length such that the sleeve is coterminal with the housing when the flange is engaged with the base, the sleeve defining with the interior of the housing an annular cavity, air delivery means in communication with the cavity, and a pilot pin extending through the sleeve having one end thereof normally projecting exteriorly of the sleeve, the other end of the pin being fixed to a resiliently mounted part providing for retraction of the pin on the sleeve, the part being mounted in the member for limited movement and with the pin having an overall length such that when the part is at one limit of movement the pin is retracted and the free end thereof is coterminal with the sleeve to form therewith an anvil.

* * * * *